(12) United States Patent  (10) Patent No.: US 8,166,305 B2
Martinez  (45) Date of Patent: *Apr. 24, 2012

(54) SET OF METADATA FOR ASSOCIATION WITH A COMPOSITE MEDIA ITEM AND TOOL FOR CREATING SUCH SET OF METADATA

(75) Inventor: Ronald Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/111,758

(22) Filed: Apr. 29, 2008

(65) Prior Publication Data

US 2008/0269931 A1  Oct. 30, 2008

Related U.S. Application Data

(63) Continuation of application No. 11/247,562, filed on Oct. 10, 2005.

(51) Int. Cl.
*H04L 9/32* (2006.01)
(52) U.S. Cl. .......................... 713/176; 726/27
(58) Field of Classification Search .................. 713/176; 726/27
See application file for complete search history.

(56) References Cited

U.S. PATENT DOCUMENTS

| | | | |
|---|---|---|---|
| 6,574,609 B1 * | 6/2003 | Downs et al. ................... 705/50 |
| 6,928,419 B2 * | 8/2005 | Stefik et al. ..................... 705/51 |
| 7,454,406 B2 * | 11/2008 | Kaplan et al. .......................... 1/1 |
| 7,533,105 B2 * | 5/2009 | Mitchell et al. ......................... 1/1 |
| 7,623,648 B1 * | 11/2009 | Oppenheim et al. ..... 379/218.01 |
| 7,707,221 B1 * | 4/2010 | Dunning et al. ............... 707/770 |
| 7,725,498 B2 * | 5/2010 | Barsness et al. ............... 707/803 |
| 7,774,713 B2 * | 8/2010 | Mital et al. ..................... 715/763 |
| 7,827,312 B2 * | 11/2010 | Ramaswamy et al. ........ 709/246 |
| 7,844,820 B2 * | 11/2010 | Martinez ....................... 713/176 |
| 7,882,110 B2 * | 2/2011 | Bahr ............................. 707/741 |
| 7,904,417 B2 * | 3/2011 | Anderson et al. ............. 707/603 |
| 7,921,116 B2 * | 4/2011 | Finkelstein et al. .......... 707/746 |
| 7,970,799 B2 * | 6/2011 | Arrouye et al. ............... 707/805 |
| 7,991,271 B2 * | 8/2011 | Candelore ..................... 386/326 |
| 2002/0049731 A1 * | 4/2002 | Kotani ............................... 707/1 |
| 2003/0051149 A1 * | 3/2003 | Robert .......................... 713/189 |
| 2003/0135464 A1 * | 7/2003 | Mourad et al. .................. 705/50 |
| 2003/0167236 A1 * | 9/2003 | Stefik et al. ..................... 705/51 |
| 2003/0182579 A1 * | 9/2003 | Leporini et al. ............... 713/201 |
| 2003/0233363 A1 * | 12/2003 | Cohen et al. .................. 707/100 |
| 2005/0015713 A1 * | 1/2005 | Plastina et al. ............. 715/500.1 |
| 2005/0240615 A1 * | 10/2005 | Barsness et al. ............... 707/102 |
| 2006/0021065 A1 * | 1/2006 | Kamperman et al. .......... 726/28 |
| 2006/0130117 A1 * | 6/2006 | Lee et al. ....................... 725/135 |
| 2006/0161635 A1 * | 7/2006 | Lamkin et al. ................ 709/217 |

(Continued)

*Primary Examiner* — David García Cervetti

(74) *Attorney, Agent, or Firm* — James J. DeCarlo; Greeberg Traurig, LLP

(57) ABSTRACT

A set of metadata for association with the composite media item and a tool for creating a composite media item with an associated set metadata. In one embodiment, the tool comprises a component for extracting a portion of a first media item having first metadata and for extracting a portion of a second media item having second metadata, a component for combining the first portion and the second portion to form a composite media item, and a component for analyzing the first metadata and the second metadata to extract portions of the first and second metadata to form a new set of metadata for association with the composite media item. In one embodiment, the new metadata is a data container.

35 Claims, 11 Drawing Sheets

U.S. PATENT DOCUMENTS

| | | | |
|---|---|---|---|
| 2006/0167804 A1* | 7/2006 | Aydar et al. | 705/51 |
| 2006/0167807 A1* | 7/2006 | Aydar et al. | 705/54 |
| 2007/0083380 A1* | 4/2007 | Martinez | 705/1 |
| 2007/0083558 A1* | 4/2007 | Martinez | 707/104.1 |
| 2007/0083762 A1* | 4/2007 | Martinez | 713/176 |
| 2007/0094139 A1* | 4/2007 | Martinez | 705/40 |
| 2007/0294295 A1* | 12/2007 | Finkelstein et al. | 707/104.1 |
| 2008/0046439 A1* | 2/2008 | Miller et al. | 707/10 |
| 2008/0162641 A1* | 7/2008 | Chandra et al. | 709/206 |
| 2008/0201299 A1* | 8/2008 | Lehikoinen et al. | 707/3 |
| 2008/0269931 A1* | 10/2008 | Martinez | 700/94 |
| 2009/0024619 A1* | 1/2009 | Dallmeier et al. | 707/5 |
| 2009/0217343 A1* | 8/2009 | Bellwood et al. | 726/1 |
| 2009/0259623 A1* | 10/2009 | Mooneyham et al. | 707/3 |
| 2011/0185042 A1* | 7/2011 | Wohlert et al. | 709/219 |
| 2011/0235801 A1* | 9/2011 | Peterka et al. | 380/200 |
| 2011/0239280 A1* | 9/2011 | Chandra et al. | 726/4 |
| 2011/0271116 A1* | 11/2011 | Martinez | 713/176 |

* cited by examiner

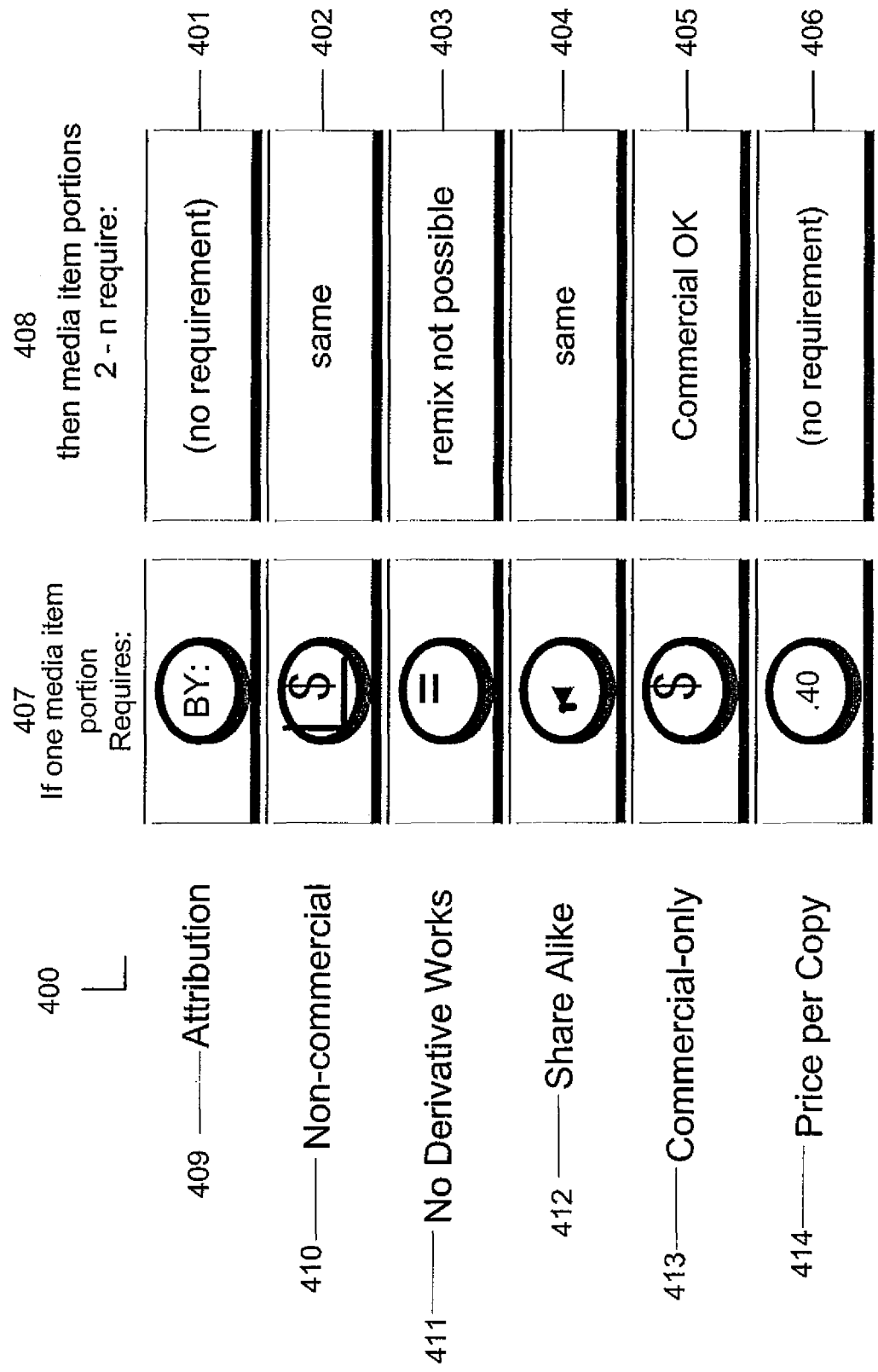

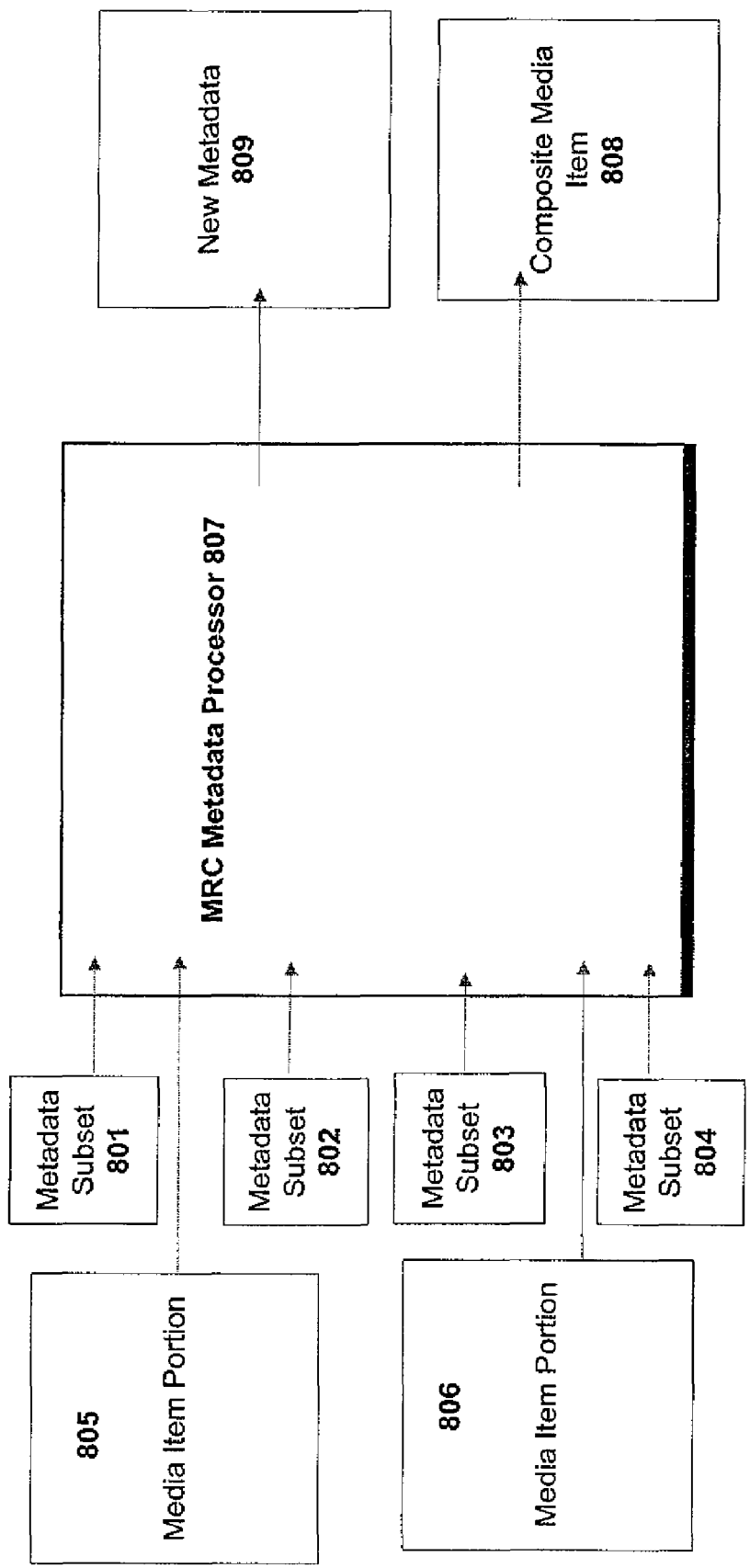

SET OF METADATA FOR ASSOCIATION WITH A COMPOSITE MEDIA ITEM AND TOOL FOR CREATING SUCH SET OF METADATA

CROSS REFERENCE TO RELATED APPLICATIONS

This application claims the benefit of U.S. patent application Ser. No. 11/247,562, filed Oct. 10, 2005, entitled A SET OF METADATA FOR ASSOCIATION WITH A COMPOSITE MEDIA ITEM AND TOOL FOR CREATING SUCH SET OF METADATA.

FIELD OF THE INVENTION

The present disclosure relates generally to a set and metadata for association with the composite media item and a tool for creating a composite media item with an associated set metadata.

BACKGROUND OF THE INVENTION

The practice of mixing and remixing media is no longer restricted to media professionals. Emerging technology of remixing digital media enables end-users to combine media elements new media products.

Further, new digital media data models, such as the MPEG-21 standard or enhanced ID3 tags, enable the binding of detailed descriptions or metadata about an item of digital media. Such data models can make it possible to determine what portions of a media item are contained in a given media item. Currently, such metadata is typically entered manually in ad hoc formats into whatever tags are available, such as, for example, ID3 tags in MP3 files. However, existing systems and software tools enable one to mix the sequences of digital data that represent the audiovisual information, but do not contemplate or make any attempt to systematically or reliably integrate the respective metadata of individual media portions that together comprise a new remixed or composite media item. Furthermore, although the new media products may be mixed together, it lacks the reliability to be associated with the rights, business rules, authorship, or accounting functionality needed to enable a marketplace in both composite media or its constituent portions. Thus, there lacks the methods and tools for combining such metadata associated with the media item when combining the media itself.

SUMMARY OF THE INVENTION

The present disclosure addresses this deficiency in the current art. In one embodiment, the present disclosure relates generally to a type of data container or metadata subset or set that easily identifies the rights, rules, terms, and various types of useful information regarding the media item or media item portion.

The present disclosure relates to a set and metadata for association with the composite media item and a tool for creating a composite media item with an associated set metadata.

In another embodiment, the present disclosure relates generally to a set of metadata for association with the composite media item and a tool for logically creating a composite media item with an associated set metadata. In further embodiments, the combined metadata of a composite media item can then be used to fulfill the rights, authorship, search and discovery, and commerce requirements necessary to the functioning of a composite media marketplace.

In one embodiment, a tool for creating a composite media item with an associated set of metadata comprises a module for identifying first metadata representing data associated with a first portion of a media item, the first portion being derived from a first source media item, the first metadata being derived from first source metadata associated with the first source media item; a module for identifying second metadata representing data associated with a second portion of the media item, the second portion being derived from a second source media item, the second metadata being derived from second source metadata associated with the second source media item; and a module for combining the first subset and the second subset so as to form new metadata, for association with the composite media item, that based upon and acquires some or all of the first metadata and the second metadata.

In one embodiment, the tool for creating the composite media item is a software application.

In one embodiment, the identifying module comprises a portion of a metadata processor. In another embodiment, the identifying module identifies either one or both of the first metadata and the second metadata is based on a search input criteria. In one embodiment, the search input criteria comprises an attribute associated with either one or both of the first metadata and the second metadata. For example, the attribute may comprise an artist name, album name, type of metadata, a musical genre, and a request for a second artist that is similar to a first artist, a rhythm pattern, a tempo, the price associated with either one or both of the first media item portion or the second media item portion, the identity of a rights holder, and/or a licensing term. In another embodiment, the identifying module identifies either one or both of the first metadata and the second metadata based on a user based browsing.

In one embodiment, the tool for creating the composite media item further comprises a module for combining the first portion and the second portion to form the composite media item. In one embodiment, the new metadata formed comprises pointers to the first portion and the second portion. In a further embodiment, the combining module combines the first and the second portions using the pointers. In another embodiment, the module for combining the first portion and the second portion comprises a portion of a metadata processor. In another embodiment, the module for combining the first portion and the second portion utilizes conditional logic. In a further embodiment, the module for combining the first metadata and the second metadata comprises a portion of a metadata processor. In one embodiment, the module for combining the first portion and the second portion utilizes a predetermined instruction set.

In one embodiment, the new metadata identifies a rights holder associated with the composite media item. In one embodiment, the tool for creating a composite media item and new data associated with the composite media item further comprises a module for facilitating a payment associated with the composite media item to the rights holder. In one embodiment, the payment associated with the composite media item is based on the logical combination based on a price derived from the first metadata and a price derived from the second metadata In one embodiment, the new metadata identifies an attribution associated with the composite media item. In another embodiment, the new metadata identifies a royalty amount associated with the composite media item. In another embodiment, the new metadata identifies a licensing term associated with the composite media item. In another embodiment, the new metadata identifies a price per copy associated with the composite media item.

In one embodiment, the tool for creating a composite media item and new data associated with the composite media item further comprises a module for facilitating a payment associated with the composite media item to a rights holder.

In one embodiment, the tool for creating a composite media item and new data associated with the composite media item further comprises a metadata language translator for translating a metadata language associated with either one or both of the first metadata and the second metadata.

In one embodiment, the new metadata associated with a composite media item is a data container. In one embodiment, the data container comprises a name or descriptive term; a pointer to commerce enabling information; and a pointer to a location of the associated composite media item. In one embodiment, the data container further comprises at least one set of informative tags associated with the composite media item. In another embodiment, the data container further comprises the format type associated with the composite media item. In another embodiment, the data container further comprises an ID unique to a community or online music service.

In one embodiment, the name or descriptive term is associated with the data container. In another embodiment, the name or descriptive term is associated with the composite media item.

In one embodiment, a remix tool comprises a component for extracting a portion of a first media item having first metadata and for extracting a portion of a second media item having second metadata; a component for combining the first portion and the second portion to form a composite media item; and a component for analyzing the first metadata and the second metadata to extract portions of the first and second metadata to form a new set of metadata for association with the composite media item. In one embodiment, either one or both of the first portion and the second portion is extracted by examining either one or both of the first metadata and the second metadata to determine availability of either one or both of the first and the second portion. In a further embodiment, extracting either one or both of the first portion and the second portion further comprises obtaining either one or both of the first portion and the second portion. In a further embodiment, either one or both of the first portion and the second portion is obtained from a server. In another embodiment, either one or both of the first portion and the second portion is obtained from a user's local media library. In another embodiment, either one or both of the first portion and the second portion is obtained from an on-demand streaming music service. In another embodiment, either one or both of the first portion and the second portion is obtained from the internet.

In one embodiment, either one or both of the first metadata and the second metadata is analyzed by traversing either one or both of the first metadata and the second metadata and comparing either one or both of the first metadata and the second metadata to known data so that either one or both of the first metadata and the second metadata is identified according to the known data.

In another embodiment, either one or both of the first metadata and the second metadata is extracted by copying either one or both of the first metadata and the second metadata and inserting the copied metadata into at least one data container.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 4 is an exemplary illustration of the logic or rules associated with a media item portion according to an embodiment of the present disclosure;

FIG. 8b is an exemplary illustration of creating a new composite media item and its associated metadata.

DETAILED DESCRIPTION OF EMBODIMENTS

Figure 1:
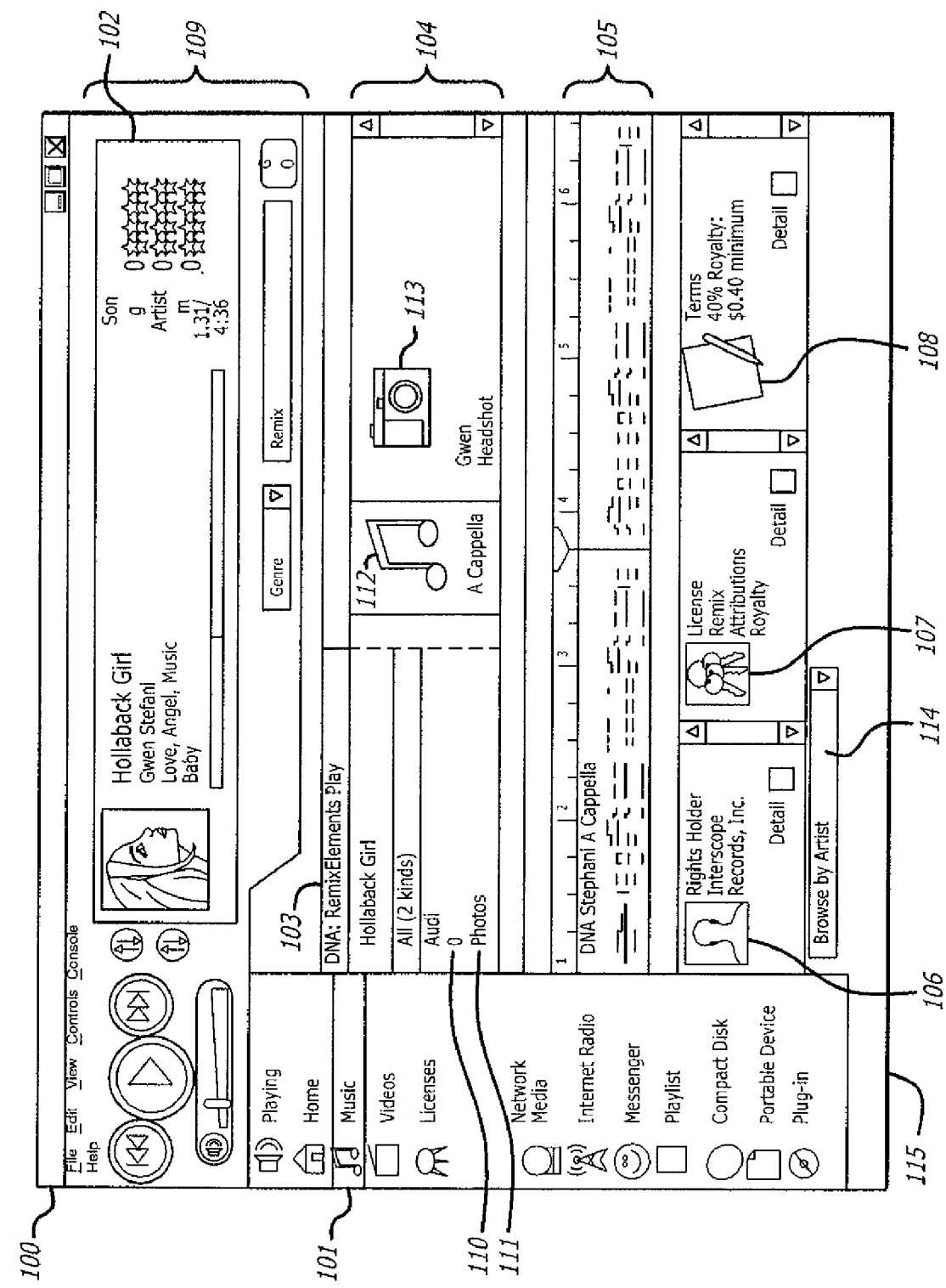
FIG. 1 is an exemplary user interface according to an embodiment of the present disclosure.

In one embodiment, the present disclosure relates to a data container associated with a media item. In another embodiment, the present disclosure relates to a rights-preserving metadata subset associated with a portion of a media item. In another embodiment, the present disclosure relates to a set of metadata for association with a composite media item and a tool for creating such composite media item with an associated set of metadata, wherein the composite media item comprises portions of media items and metadata subsets.

In further embodiments, either of the data container, the rights-preserving metadata subset, the set of metadata associated with a composite media item, or the tool can be used to fulfill the rights, authorship, search and discovery, and commerce requirements necessary to the functioning of a composite media marketplace.

Certain embodiments of the present disclosure will now be discussed with reference to the aforementioned figures wherein like reference numerals refer to like components. The figures are intended as exemplary embodiments and are not intended to be limiting. As used herein, the terms "media" or "media items" are used broadly to encompass any type or category of experienceable, retrievable, filed and/or stored media, either singly or collectively, and individual items of media or content are generally referred to as entries, songs, tracks, items or files, however, the use of any one term is not to be considered limiting as the concept's features and functions described herein are generally intended to apply to any storable and/or retrievable item that may be experienced by a user, whether audibly, visually or otherwise, in any manner now known or to become known. Further, the term media comprises all types of media such as audio and video, text, photos, or other forms.

In one embodiment, a data container is associated with a media item. In this embodiment, a container is a structure that allows items and or other containers to be grouped. In another embodiment, a container can also comprise sets of metadata which may or may not be physically located in the container.

In one exemplary embodiment, the data container associated with a media item comprises at least one metadata subset associated with a portion of a media item, wherein the portion is derived from a source media item and wherein the metadata subset is derived from metadata associated with the source media item; container-related metadata; and at least one media item identifier associated with a media item that may or may not be said source media item. Thus in one embodiment, the data container comprises any number and type of set(s) of metadata associated with a media item portion, any number and type of set(s) of metadata associated with the container itself and any number and type of media item identifier(s). For example, in one embodiment, a data container may comprise three sets of metadata, each associated with a different media item portion, five different types of container related metadata, and six media item identifiers.

In one embodiment, the data container comprises at least one metadata subset. In one embodiment, the metadata subset is a subset or identifiable group that is associated with a media item portion and is derived from the metadata associated with a source media item.

In one exemplary embodiment, the metadata subset comprises information or data about a media item portion such as the name of the artist or performer, the album name, the identity of a composer, the identity of lyricist, the identity of a lead performer or soloist, the genre, the tempo, the rhythm pattern, the date or time of recording of the media item, identity of the language associated with the media item, the original filename of the media item, the original release year of the media item, the format type of the media item, a URL or link to the official webpage of an on-demand music service or internet radio station, or the a URL or link to the official webpage of the artist, album, rights holder, or producer associated with the media item.

For example, the source media item may be an audio media file comprising a backing track media item portion, a jpeg image media item portion, and a cappella media item portion. Thus, the metadata subset associated with the media item portion may comprise data or information about the backing track media item portion, the jpeg image media item portion, and the cappella media item portion such as the date of creation of each media item portion, the size of each media item portion, or the price of per copy of each media item portion.

In another example, the media item portion may be the instrumental part of a media item. Accordingly, the metadata subset is the metadata that is associated with the instrumentals portion such as the identity of a composer or lead performer of the instrumental portion, tempo, timing, key or other such information.

In a further embodiment, the metadata subset associated with a portion of a media item (media item portion) comprises a set of commerce enabling information. In one embodiment, commerce enabling information governs the use of a media item or portion. Commerce enabling information refers, by way of non-limiting example, to information, data, or pointers thereto, that can be utilized to facilitate electronic commerce involving a media item. For example, such commerce enabling information can comprise the identity of attribution, the identity of a rights holder, a link or address of a website, a copyright message or a pointer thereto, licensing information or pointer thereto, or a digital rights management (DRM) related license or authorization or pointer thereto. The commerce enabling information may also comprise the authorship of the media item portion, the royalty amount of each media item portion, the price per copy of the media item, whether the media item portion is available for combining, the business terms, rules, and rights governing the use of a media portion could include designations derived from the metadata subsets such as whether a media item portion is designated non-commercial or commercial-only, or is designated as unavailable for inclusion in any derivative works or conversely is designated as available for inclusion in any derivative works, and designated as share-alike, meaning that a new derivative work containing the media portion can only be made available with identical licensing terms.

In one embodiment, the media item portion may be any type of identifiable portion or component of media item. For example, an a capella track, a backing track, a sample or loop of a media item recording, the beat of a media item, the chords of a media item, a graphical image, the equalizer presets, a band or orchestra accompaniment, the instrumentals, a conductor or performer refinement, or part of a set.

In one embodiment, the data container comprises a media item identifier. In one exemplary embodiment, the media item identifier is associated with a media item. In another exemplary embodiment, the media item identifier comprises information identifying the media item and the contents of the media item itself. In other embodiments, the media item may be located, identified, and/or acquired from several sources and through different ways. For example, the media item portion may be acquired from a server, from a user's local media library, from an on-demand streaming music service, and/or from the internet. In one embodiment, the media item identifier is associated an item that may or may not be a source media item. In another embodiment, the media item identifier may be a pointer, a uniform resource locator, or an id unique to an online music service or an online community.

Furthermore, in one embodiment, the data container comprises metadata related to the container itself. In one exemplary embodiment, the container related metadata comprises a string of text representing the name of the container, a string of text representing the media item portion title, the date the container is created and/or last modified, the genre associated with the overall items within the container, the size of the container, the length of the container, the content type of the container, the file type, the international standard recording code associated with the container, the software and/or hardware necessary for encoding and decoding the container and its items, and/or any user-defined text information. A pointer points to a media item located anywhere—even within the container itself.

Described below, by way of example, are several formulations and methods for creating a data container. For example, the container may be constructed so that software programs acting upon or utilizing the container can expect given fields or portions of the metadata or data to contain data representing useful information. Containers may comprise software objects or software objects may comprise containers. Further, such containers may be created using a variety of methods such as XML, using linear strings of data with internal header information, or software objects such as those utilized in the Java or C++ programming language, with data encapsulated within the software object according to the conventions of the language used. Any and all methods and programs for creating such a data container known by one skilled in the art presently or the equivalents thereof in the future are also contemplated.

Figure 7:
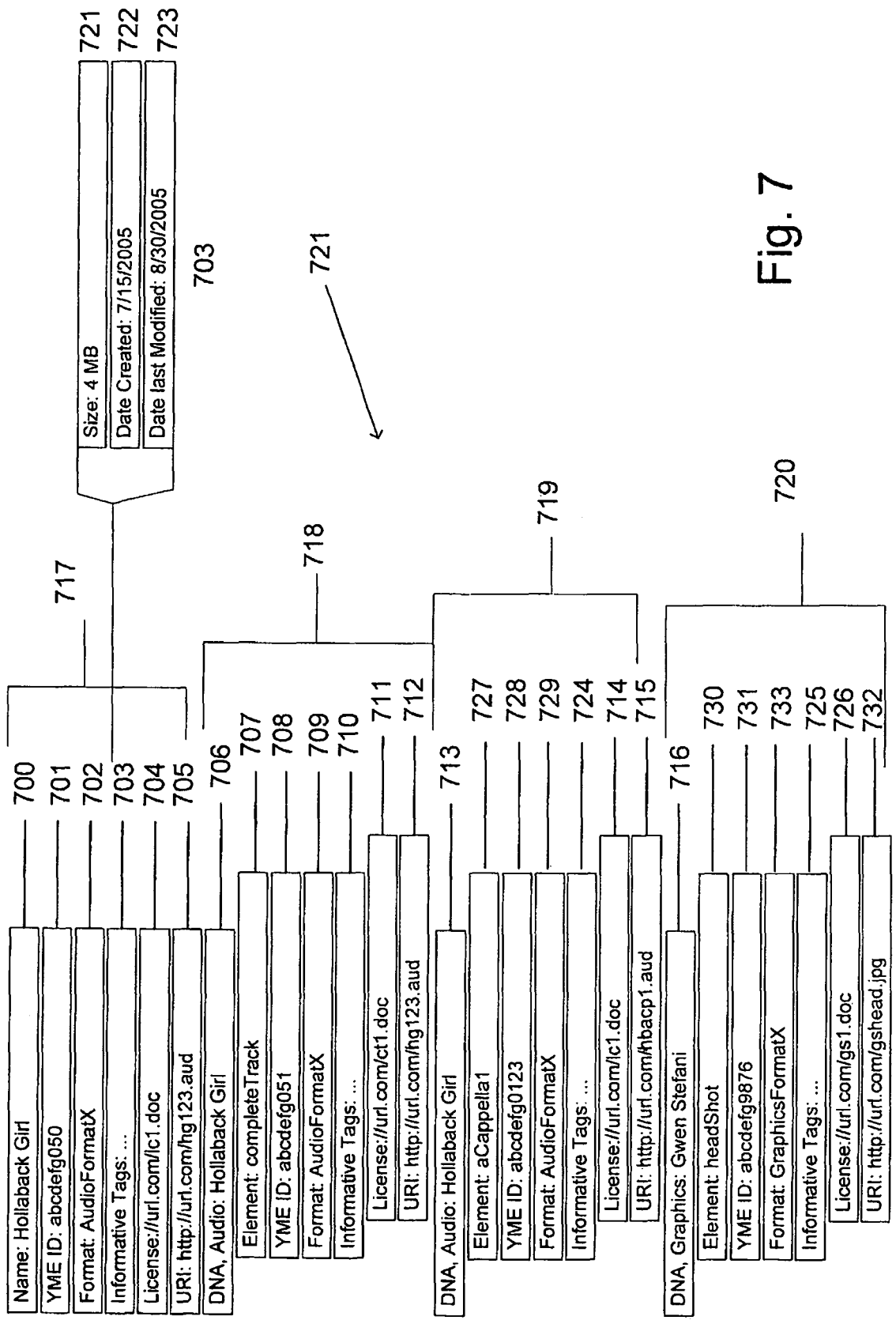
FIG. 7 is an exemplary illustration of a data container according to an embodiment of the present disclosure.

FIG. 7 illustrates one exemplary embodiment of a data container 721 associated with a media item. As can be seen in the embodiment depicted in FIG. 7, the data container 721 comprises of a first metadata subset 718 associated with a media item portion, a second metadata subset 719 associated with a media item portion, a third metadata subset 720 associated with a media item portion, and container related metadata 717. In the embodiment as depicted in FIG. 7, the first metadata subset 718 is the complete media item or source media item, the second metadata subset 719 is the A cappella vocals, that is, the same vocals as included in the complete media item, but without any instrumentals, and the third metadata subset 720 is a graphical image such as a jpeg.

In one embodiment, the container related metadata 717 can include any type, combination, or number of information or data associated with the attributes of the container itself. In another embodiment, the container related metadata can include any type, combination, or number of information or data associated with the attributes of a media item source, media item portion, or media item. In one exemplary embodiment, as depicted in FIG. 7, the container related metadata 717 comprises a name or descriptive term associated with the container 700, an internal metadata subset reference 706, an ID unique to a community or online music service 701, a format type of the container 702, a set of informative tags 703, a pointer to a set of rights. 704, and a pointer 705 to a physical file location of the associated media item. By analogy, it is contemplated that a container represents a genome for a media item, and the internal metadata is analogous to DNA that may be spliced to create new media "life forms".

One exemplary embodiment of a metadata subset of a data container is depicted in FIG. 7. As discussed above, the metadata subsets are a subset or identifiable group that is derived from the metadata associated with a media item portion. For example, a metadata subset may comprise any number and combination of information or data about a media item portion such as the name of the artist or performer, the album name, the identity of a composer, the identity of lyricist, the identity of a lead performer or soloist, the date or time of recording of the media item, identity of the language associated with the media item, the original filename of the media item, the original release year of the media item, the format type of the media item, a URL or link to the official webpage of an on-demand music service or internet radio station, or the a URL or link to the official webpage of the artist, album, rights holder, or producer associated with the media item. As can be seen in FIG. 7, each of the metadata subsets 718, 719, 720 comprise an internal metadata subset reference 206, 713, 716; a name or descriptive term associated with the type of the subset 707, 727, 730; an ID unique to a community or online music service 708, 728, 731; a format type of the subset 709, 729, 733; informative tags 710, 725, 725; a pointer to a license 711, 714, 726; and a pointer to a physical file location of the associated media item 712, 715, 732.

In one embodiment, the container ID 701, 708, 728, 731 unique to a community or online music service may be associated with any type of entity capable of assigning unique IDs. Further, the unique ID may be kept in a registry or collection of unique IDs. The registry can be maintained by any type of entity or a federation of entities.

In one embodiment, the format type of the container 702 describes the nature of the media items referenced in the data container. For example, the format may be audio, a podcast, enhanced podcast including visual material, MP3 or AAC audio track, digital video, e-Book, or a webpage, blog or other format. Moreover, static media may also be included, such as a JPEG still image. In a further embodiment, the format type may be a logical combination or a concatenation of all the different types of format types included in the data container. In the present disclosure, the terms logic, logical, and rules are used interchangeably, and are generally intended to refer broadly to any application specific set of rules, instructions, or heuristics that may be implemented and followed to achieve a desired result. Accordingly, the format type of each of the metadata subsets 709, 729, 733 may be audio, a podcast, enhanced podcast including visual material, MP3 or AAC audio track, digital video, e-Book, blog entries, static media such as a JPEG still image, or other format.

In one embodiment, the informative tags 703, 710, 725, 725 can vary as to number or length. In the embodiment depicted in FIG. 7, the informative tags are associated with the container itself 703. In another embodiment, the informative tags 710, 724, 725 are associated with the metadata subsets 718, 719, 720. An exemplary excerpt of the container related metadata informative tag 703 is depicted in FIG. 7. As can be seen, the informative tag associated with the container related metadata 703, includes the size 721 of the container, the date the container is created 722, and the date the container was last modified 723. Other types of informative tags included in metadata subsets 718, 719, 720 and/or the container related metadata 703 includes, but is not limited to a string of text representing the name of the container, a string of text representing the media item portion title, pricing information, the genre associated with the overall items within the container, the length of the container, the content type of the container, the file type, the international standard recording code associated with the container, the software and/or hardware necessary for encoding and decoding the container and its items, and/or any user-defined text information.

In one embodiment, the pointer to a license 704, 711, 714, 726 includes, but is not limited to a pointer to licensing information or related message, a DRM authorization or message, contract terms, or copyright information or message. In one exemplary embodiment, a URL may reference a document containing machine-readable licensing information such as, for example, a machine readable Creative Commons license. In another embodiment, the license information might be directly embedded within the metadata subset and/or data container itself. Indirect reference of a licensing term or set of rights, in one aspect, enables the updating of terms as only the destination document need be changed to propagate new licensing terms to all relevant metadata subsets and/or data containers.

In one embodiment, the pointer to a physical file location of the associated media item 705, 712, 715, 732 comprises a pointer to a physical file location where a media item portion or media item may be found. In another embodiment, the media itself might be directly embedded within the metadata subset and/or data container. In one example, a URL may reference an AAC audio media item portion stored on a server. Further, the media item or media item portion may be acquired from a server, the internet, or a user's local media library. Thus, in one aspect, through the indirect reference of the media item portion or media item, distribution and commerce is simplified, as data containers may be exchanged in a commerce implementation, without the inconvenience or expense of exchanging files in every transaction. Thus, the user in possession of a data container can cause the media to be streamed or transferred to his or her media player of choice when she desires to do so.

In one embodiment, a commerce enabling metadata subset associated with a media item portion is disclosed. In one exemplary embodiment, the commerce enabling metadata subset may comprise a set of commerce enabling information associated with a media item portion, wherein the portion is derived from a source media item and wherein the metadata subset is derived from a commerce-enabled related metadata associated with the source media item. As stated above, the media item portion and source media item can be of various types. Thus, the metadata subset remains associated with the media item portion in order to preserve a relationship between the commerce enabling information and the metadata portion when the source media item and the media item portion exists separately.

In one embodiment, the commerce enabling information comprises information that governs the use of a media item portion. For example, in one embodiment, such commerce enabling information comprises the identity of attribution, the identity of a rights holder, a link or address of a website, a copyright message or a pointer thereto, licensing information or pointer thereto, or a digital rights management (DRM) related message or pointer thereto. Furthermore, the commerce enabling information comprises the authorship of the media item portion, the royalty amount of each media item portion, the price per copy of the media item, whether the media item portion is available for combining with the media items, the business terms, rules, and rights governing the use of a media portion could include designations derived from the metadata subsets such as whether a media item portion is designated non-commercial or commercial-only, or is designated as unavailable for inclusion in any derivative works or conversely is designated as available for inclusion in any derivative works, and designated as share-alike, meaning that a new derivative work containing the media portion can only be made available with identical licensing term.

In a further embodiment, the commerce enabling metadata subset may be a part of a data container as discussed above. In another embodiment, the commerce enabling metadata subset may be associated with a media item portion used to create a composite media item as discussed in further detail below.

In one embodiment, a set of metadata for association with a composite media item is disclosed. In one exemplary embodiment, the set of metadata for association with a composite media item comprises a first metadata subset representing data associated with a first portion of a media item, the first portion being derived from a first source media item, the first metadata subset being derived from first metadata associated with the first source media item; and a second metadata subset representing data associated with a second portion of the media item, the second portion being derived from a second source media item, the second metadata subset being derived from second metadata associated with the second source media item, the first portion and the second portion being combined to form a composite media item, the first subset and the second subset forming a set of metadata for association with the composite media item that comprises predetermined information based on the first metadata subset and the second metadata subset.

The metadata associated with a composite media item can be formed from any number or any type of metadata subsets. As stated above, in one embodiment, a metadata subset may be a subset or identifiable group that is derived from the metadata associated with a media item portion. Furthermore, as stated above, in one embodiment, the media item portion or a source media item comprises any type of identifiable portion or component of media item.

Figure 6:
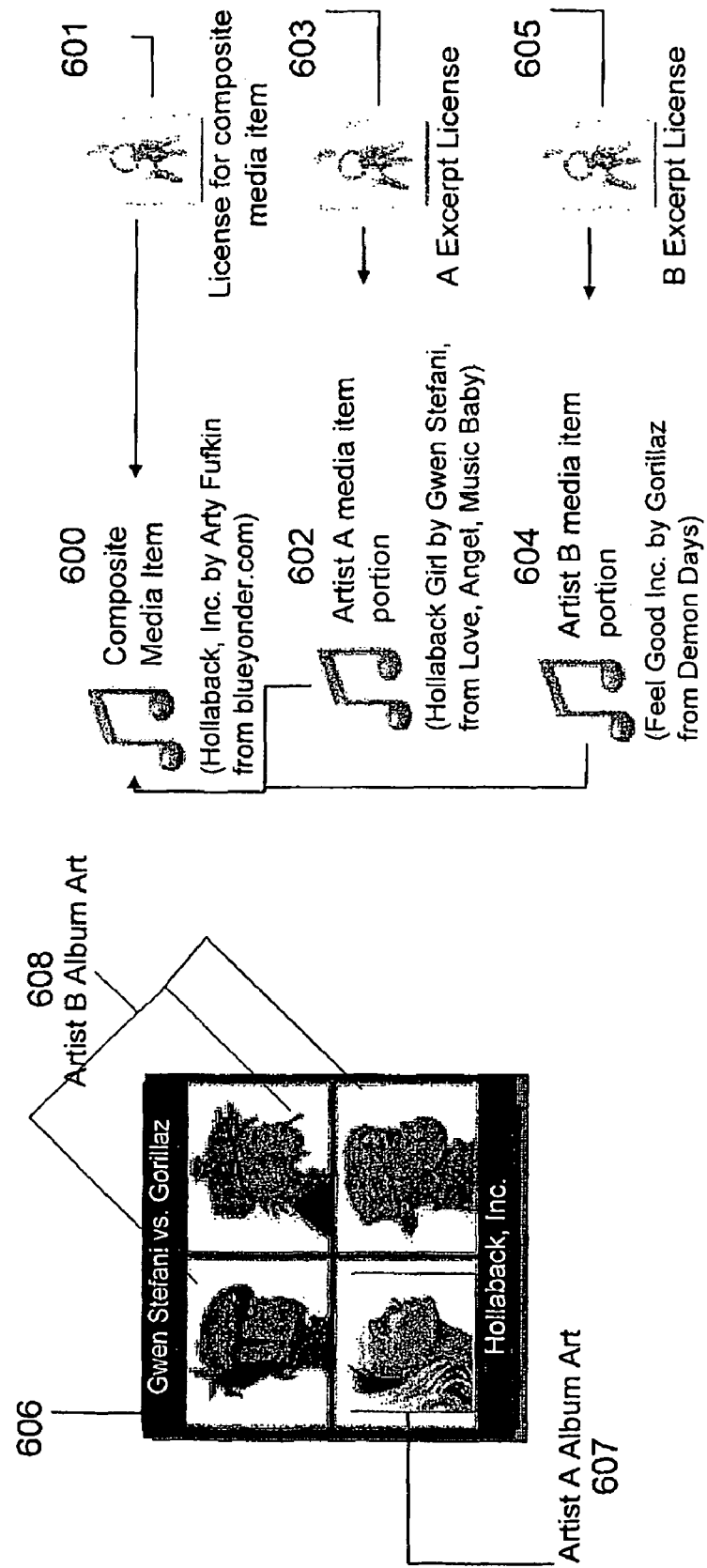
FIG. 6 is an exemplary illustration of combining media item portions according to an embodiment of the present disclosure.

FIG. 6 depicts in conceptual form one exemplary embodiment of a composite media item created from two media item portions. As can be seen in FIG. 6, the composite media item 600 is a track entitled "Hollaback Inc." As shown in FIG. 6, the composite media item is created from two media item portions "Hollaback" 602 and "Feel Good Inc" 604. In addition to the media item portions 602, 604 being combined to create the composite media item 600, the metadata subsets associated with the media item portions 602, 604 in combination create metadata associated with the composite media item comprising licensing information 600 and a graphical image 606. In particular, the composite media item 600 has an associated metadata comprising a license 601 based on two metadata subsets; a license excerpt information from both "Hollaback" 603 and "Feel Good Inc" 605. Furthermore, metadata associated with the composite media item 600, in this case a graphic image 606 associated with the media item portion "Hollaback Inc" 600, is created from the combination of two other metadata subsets; a graphic image from "Hollaback" 607 and a graphic image from "Feel Good Inc" 608.

In one embodiment, the media item portions/metadata subsets are combined using a metadata processor capable of identifying the relevant metadata, extracting the metadata, and combing the metadata into a new set of metadata. In one embodiment, the media item portions/metadata subsets may be combined via concatenating the metadata subsets. In another embodiment, media item portions are combined using a set of logic and/or rules discussed in further detail below.

In one embodiment, the newly formed set of metadata associated with the composite media item comprises predetermined information based on the metadata subsets. In one embodiment, the predetermined information comprises any information derived from the metadata subset. In another embodiment, the predetermined information can be any type of metadata information such as the media item's name, a media item's location, the nature of the media item, the size of the media item, the creation date of the media item, the date of the last modification of the media item and or metadata, the last date the media items accessed, permissions associated with the media item such as the identity of whom can read, write, and/or run the media item, and any of the metadata subset types discussed above.

In another embodiment, the predetermined information comprises the identity of a rights holder associated with a media portion. For example, a record label or producer who owns the rights to distribute and reproduce the media item portions.

In another embodiment, the predetermined information comprises commerce enabling information that governs the use of a media item portion. As stated above, such commerce enabling information can comprise the identity of attribution, the identity of a rights holder, a link or address of a website, a copyright message or a pointer thereto, licensing information or pointer thereto, or a digital rights management (DRM) related license or authorization or pointer thereto. Commerce enabling information also preferably, but not necessarily comprises the authorship of the media item portion, the royalty amount of each media item portion, the price per copy of the media item, whether the media item portion is available for combining, the business terms, rules, and rights governing the use of a media portion could include designations derived from the metadata subsets such as whether a media item portion is designated non-commercial or commercial-only, or is designated as unavailable for inclusion in any derivative works or conversely is designated as available for inclusion in any derivative works, and designated as share-alike, meaning that a new derivative work containing the media portion can only be made available with identical licensing term.

In an alternative embodiment, the newly formed set of metadata associated with the composite media item not only comprises the predetermined information, but also a logical combination of the predetermined information. For example, the price per copy of one media item portion may be 0.50 cents, and the price per copy of another media item portion may be 0.80 cents. Thus, through logical operators, the prices are added to produce the total minimum price of a composite media item copy based on the two media item portions is $1.30. Alternatively, the price may be portion dependent, so that, for example, discounts or alternative pricing models could be applied.

In a further embodiment, the logic is conditional logic. For example, one metadata subset may be designated as commercial only, meaning that it can only be combined with other media item portions having metadata subset designated also as commercial only. Thus, in one embodiment, if the designations derived from the metadata subsets conflict, as determined by applying logical operators or a set of rules, the media item portions cannot be combined.

In one embodiment, a tool for creating a composite media item with an associated set of metadata is disclosed. It is important to note that the metadata associated with composite media item, the data container, and the rights-preserving metadata set discussed above are not limited to being created solely by the disclosed tool, as other types of programs and methods are contemplated.

In one embodiment, the tool may be a part of a software application. In another embodiment, the tool may be part of a software application incorporated in a music management application, for example, such as media applications sold under the trade names MusicMatch Jukebox and/or Yahoo! Music Engine. In a further embodiment, the tool may comprise a metadata processor for identifying, extracting, and combining metadata. In yet a further embodiment, the metadata processor may also comprise a metadata language interpreter or translator for interpreting and/or translating the metadata languages of disparate media items into the same metadata language so the metadata may be more easily combined and subsequently interpreted as applied.

In one embodiment, the tool may be stored locally on an end-user's computing device. In another embodiment, the tool may be accessible from a remote computing device or a remote server. In another embodiment the tool may be machine readable code on a storage medium or embedded in a signal. In one embodiment, the computing device may be a personal computer, personal digital assistant, a cellular telephone, a portable media player, and/or any device now known or to become known capable of accommodating the tool as herein described.

In one embodiment, the tool comprises a component for extracting a portion of a first media item having first metadata and for extracting a portion of a second media item having second metadata, a component for combining the first portion and the second portion to form a composite media item, and preferably a component for analyzing the first and second metadata in order to extract predetermined portions of the first and second metadata to form a new set a metadata for association with the composite media item.

In one embodiment, a portion of a media item may be extracted by examining the container to discover what portions are available, then following links to the physical media and downloading or otherwise obtaining it from its location as represented in the container, whether that location is local and in fact bound to the metadata in the file being examined or located on a distant computer accessible via the Internet or other network.

In one embodiment, the metadata is analyzed. In one embodiment, analyzing the metadata comprises traversing the metadata and examining the information according to find known items of information, then relating those items of information to known schema, such that they may be subjected to logical or ruled based processes to determine if the media portions can be combined and what commercial terms might govern such combination. In one embodiment, the relevant information is copied from the metadata portions in the container object, inserted into data structures used by the program during manipulation of the media item portions. Program logic, such as object-oriented programming methods capable of acting upon the data may then be applied to accomplish tasks relevant to analyzing or combining the media portions. A work-in-progress data container that will hold the combined information is also created by the program, and relevant information is inserted into this data container. Thus, in one embodiment, when the finished work is complete, the work-in-progress data container is saved in a form that enables its transfer between users or machines locally or across networks.

In one embodiment, the first portion and the second portion are combined according to a set of logic and/or rules discussed in further detail herein or developed in accordance with the teachings herein.

In an alternate embodiment, the tool for creating a composite media item with an associated set of metadata comprises a module for identifying a first metadata subset representing data associated with a first portion of a media item, the first portion being derived from a first source media item and the first metadata subset being derived from first metadata associated with the first source media item; a module for identifying a second metadata subset representing data associated with a second portion of the media item, the second portion being derived from a second source media item, the second metadata subset being derived from second metadata associated with the second source media item; a module for combining the first portion and the second portion to form a composite media item; and a module for combining the first subset and the second subset so as to form a set of metadata for association with the composite media item that comprises predetermined information based on the first metadata subset and the second metadata subset. As used herein the term module is used broadly, in non-limiting fashion, to define or describe any single or plural component of software, hardware, firmware, signal, or combination thereof, capable of performing a task, function or operation. Modules may be formed of other modules or may be formed of parts of other modules, or may be the result of functions distributed across a network or parts thereof.

In one embodiment, a metadata subset is identified by a user-based search using input criteria associated with the metadata subset such as an artist, album, song title, genre, tempo, timing, rhythm, type or category of metadata, price, rights holders, business or licensing terms or rules, or any of the type of information discussed above that associated with the metadata subset. In another embodiment, the metadata subset is identified through a browsing tool that may be operable on an end user computer or available via a network. In another embodiment, the metadata is identified via a metadata processor. In another embodiment, the metadata subset is identified using a metadata language translator or interpreter. In another embodiment, the metadata subset is identified by examining the container-related metadata to discover pointers to those subsets. In other words, in one embodiment, the header information is known to contain a pointer to a linked list of metadata subsets. When the program finds the starting point of the linked list by examining the container metadata, it is thereafter able to find the first metadata subset, and in that metadata, find a pointer or data location to the next metadata subset, and so on. There are a number of approaches to traversing and examining related sets of data or subsets of such data. For example other embodiments comprise the use of tables, XML tags, arrays of pointers, and so on. Any such method and others is a way that metadata subsets can be identified. Once such a subset has been identified, similar techniques enable the program to extract the individual pieces of information comprising the metadata subset.

In one embodiment, a metadata subset is derived from metadata by querying a data dictionary using SQL statements, an API constructed to derive metadata subsets, or any of the methods discussed above.

In one embodiment, the metadata subsets may be combined into a set of metadata associated with a composite media item via a metadata processor. In one embodiment, the metadata processor is a software program capable of examining and identifying the metadata associated with each media item and media item portion.

Figure 3A:
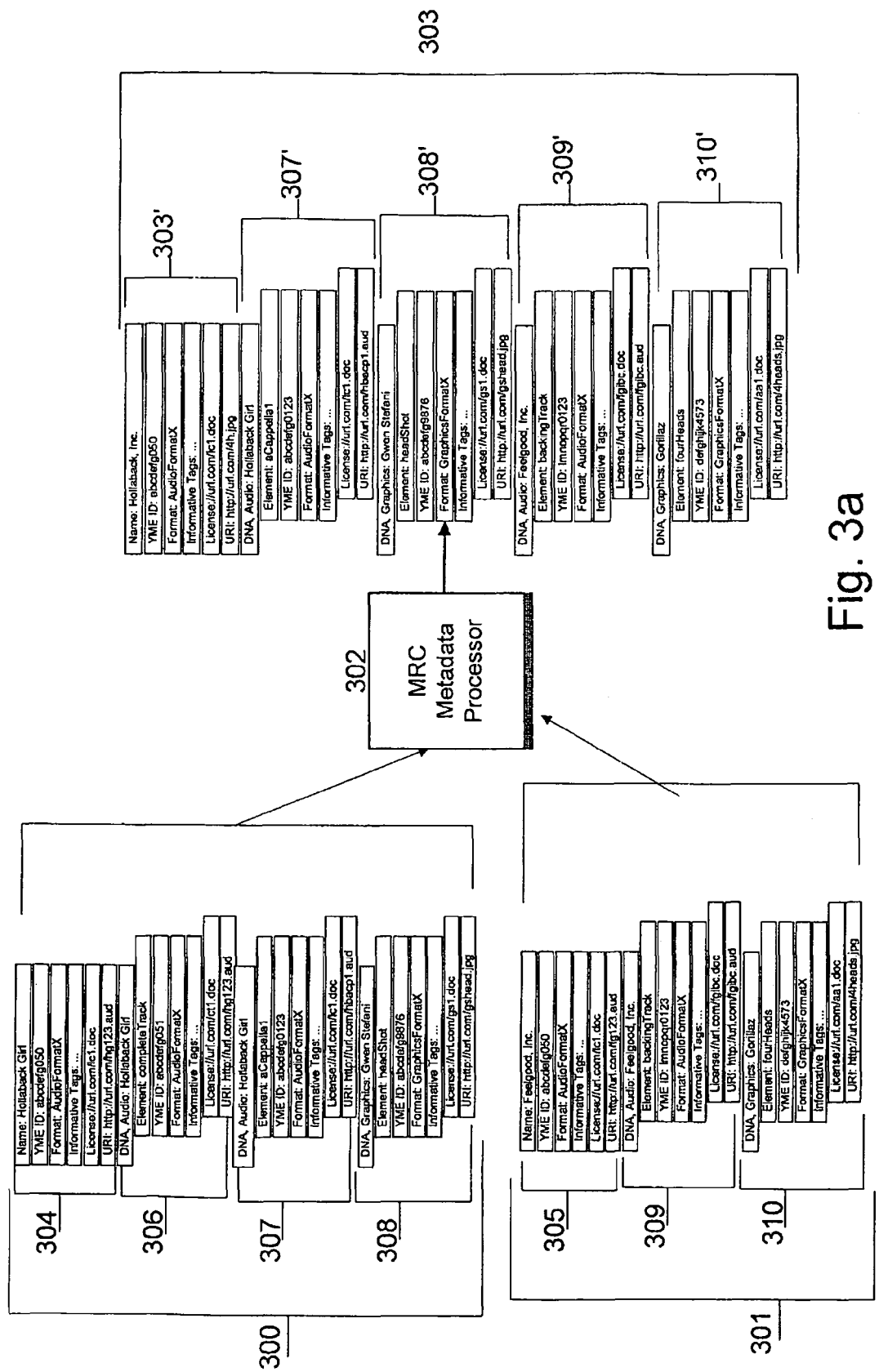
FIG. 3a is an exemplary illustration of combining metadata subsets according to an embodiment of the present disclosure.
Figure 3B:
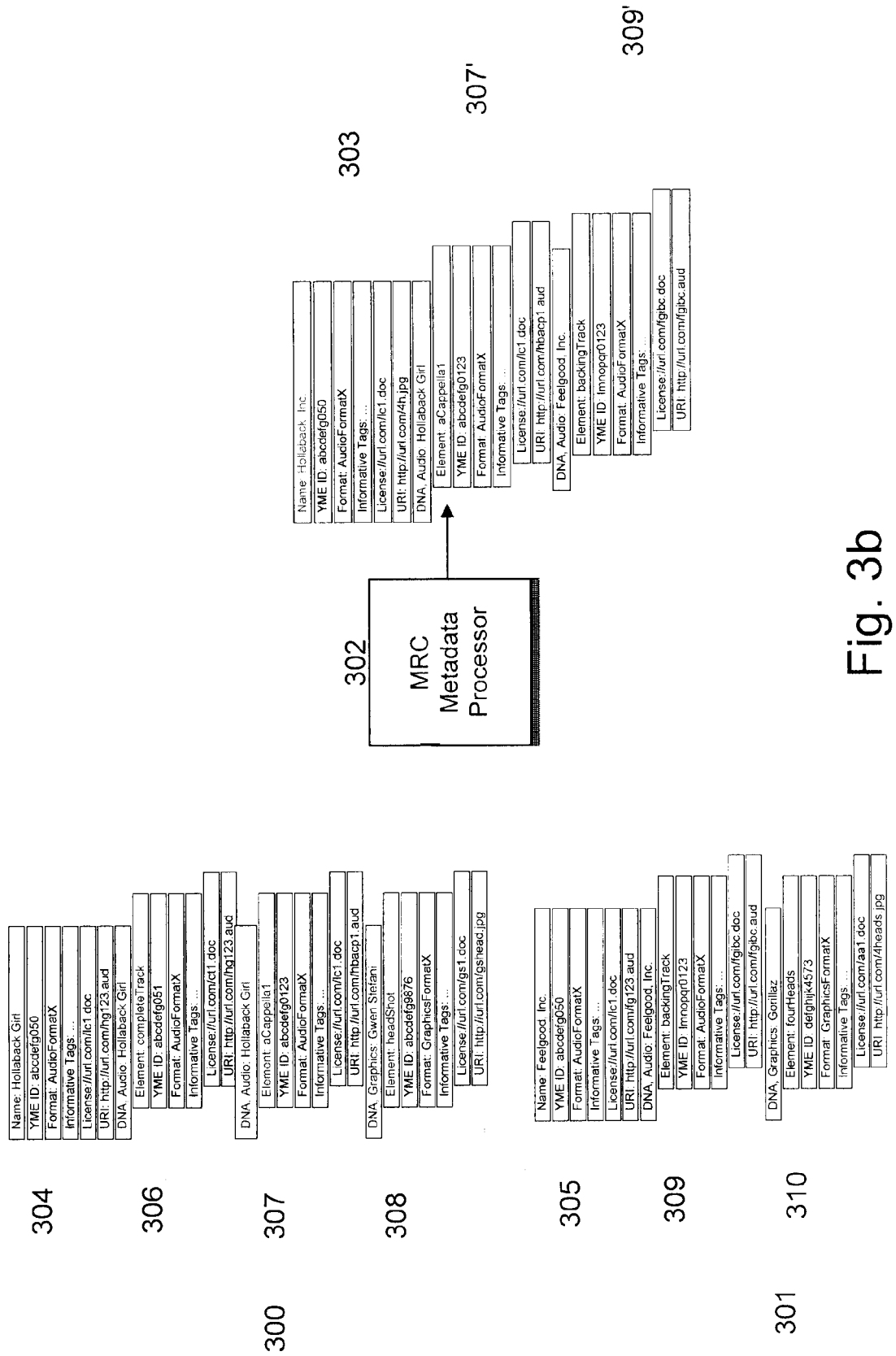
FIG. 3b is an exemplary illustration of combining metadata subsets according to an embodiment of the present disclosure.
Figure 3C:

One exemplary embodiment of combining metadata is depicted in FIG. 3c. FIG. 3c depicts two sets of metadata 300, 301 each associated with a media item or source media item (not shown) and comprising at least one metadata subset. Further, some or all of these metadata subsets are combined to form a new metadata 303 associated with a composite media item (not shown). As depicted in FIG. 3c, the metadata 300, 301 associated with a media item or a source media item (not shown) comprises metadata subsets 304, 306, 307, 308, 305, 309, 310. In one embodiment, the metadata subsets 304, 306, 307, 308, 305, 309, 310 are each associated with a media item portion, wherein the media item portion (not shown) is derived from the media item or source media item (not shown). For example, in FIG. 3c, the metadata subset 307 associated with the a capella media item portion is derived from the metadata 300 associated with the media item or source media item (not shown), "Hollaback Girl."

As depicted in FIG. 3c, the metadata processor 302 examines and determines the type and makeup of each of the metadata 300, 301 associated with media items or source media items (not shown) and the metadata subsets 304, 306, 307, 308, 305, 309, 310 associated the media item portions (not shown). Then, the metadata processor converts some or all of the metadata subsets 304, 306, 307, 308, 305, 309, 310 into new metadata 303 associated with the newly created composite media item (not shown). In one embodiment, the new metadata 303 is formed by the metadata processor 302 concatenating or otherwise combining the metadata subsets. In another embodiment, the new metadata 303 is formed by the metadata processor 302 via application specific logic and/or rules that may preserve some, all, or none of the metadata subsets 304, 306, 307, 308, 305, 309, 310. For example, in FIG. 3c, the new metadata 303 comprises data associated with the title of the composite media item associated with the new metadata 303, in this case "Hollaback Inc." With respect to this example, the metadata processor 302 extracts "Hollaback" from the title from one metadata subset 304 and "Inc" from the title from metadata subset 305 to form a new title, "Hollaback Inc", in the new metadata 303.

Figure 8A:
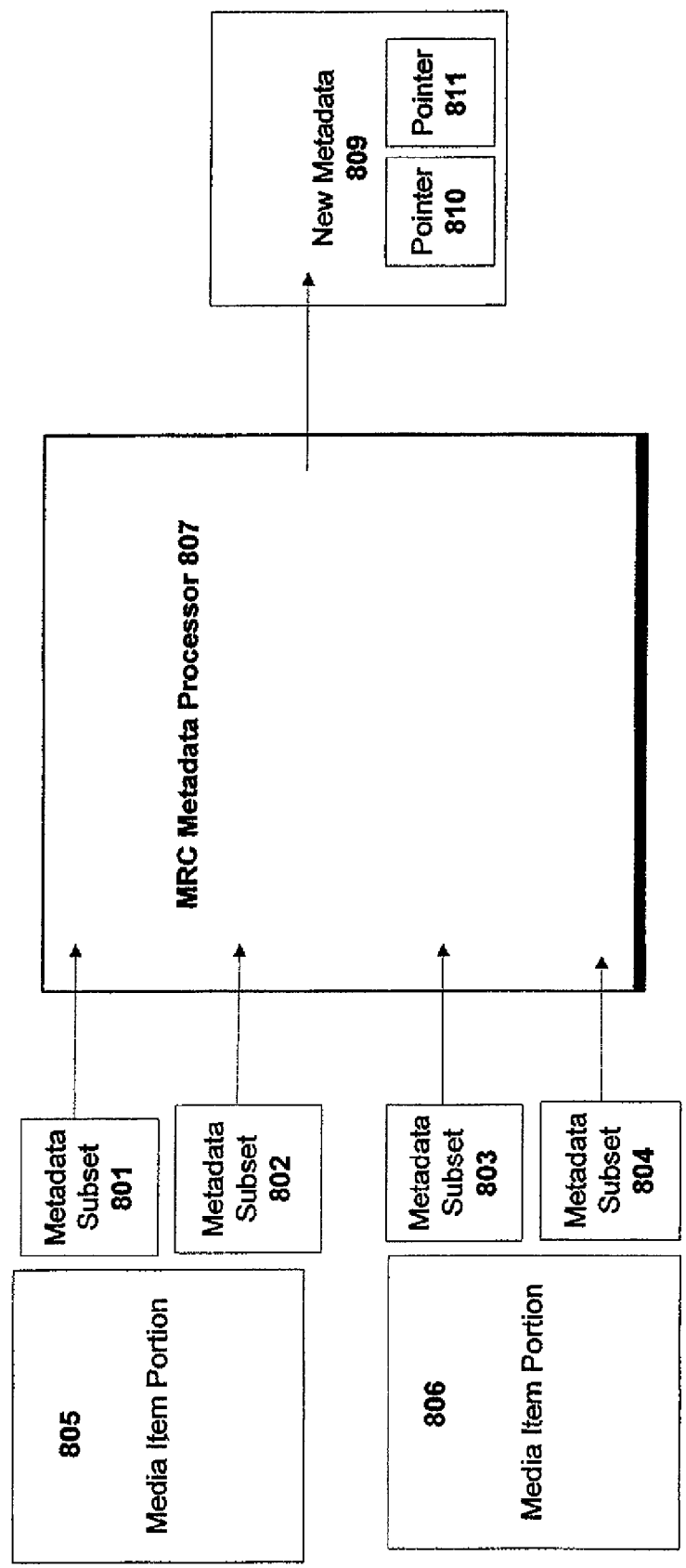
FIG. 8a is an exemplary illustration of creating a new composite media item and its associated metadata.

Various different methods are contemplated for creating a composite media. FIG. 8a depicts an exemplary embodiment of creating new metadata associated with a composite media item. FIG. 8a depicts media item portions 805, 806, metadata subsets 801-804 associated the media item portions 805, 806, a metadata processor 807, and new metadata 809 comprising pointers 810, 811. The pointers 810, 811 are each respectively associated with media item portions 805, 806. For example, pointer 810 may be associated with and thus point to media item 805 and pointer 811 may be associated with and thus point to media item portion 806. The term pointer refer generally to any for of location identifier that point to, or identifiers, a location on a global network or portion thereof, intranet, a distributed storage environment, in whatever form accessed, where media items or portions thereof may be found. In one embodiment, a composite media item (not shown) can be created from the media item portions 805, 806, and the new metadata 809 is associated with this new composite media item. In FIG. 8a, through a set of logic and/or rules, the metadata processor 807 interprets the metadata subsets 801-804 and then processes them to create new metadata 809. As depicted in FIG. 8a, the new metadata 809 comprises pointers 810, 811 associated with the media item portions 805, 806. The pointers 810, 811 may be used by a media playing device or application to acquire or otherwise access the media item portions 805, 806 in various ways. For example, the media item portions may be streamed from a server, the internet, or a remote location, the media item portions may be downloaded, and/or acquired from a local memory. Thus, via the pointers contained in new metadata 809, the media item portions are acquired or otherwise accessed. Thus, when the pointers are simultaneously or sequentially acquired, or otherwise accessed, the composite media file will be accessed or reproduced. For example, if the pointers 810, 811 point to locations on a global network from which media may be streamed, the newly created composite media item is experienced by streaming media item portions 805, 806, as appropriate.

Figure 5:
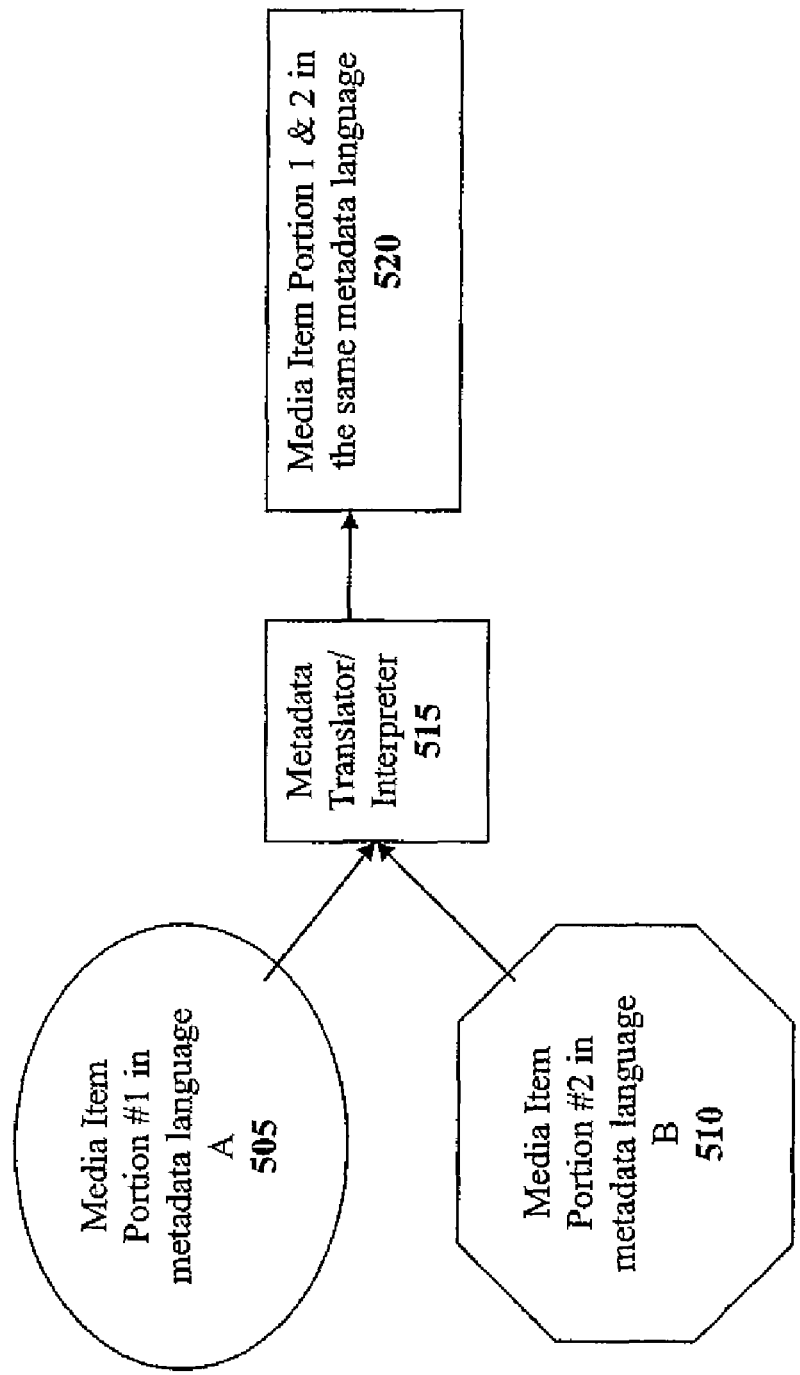
FIG. 5 is an exemplary flowchart according to an embodiment of the present disclosure.

FIG. 8b depicts another exemplary embodiment of creating new metadata associated with a composite media item. FIG. 5b depicts media item portions 805, 806, metadata subsets 801-804 associated the media item portions 805, 806, a metadata processor 807, a newly created composite media item 808, and new metadata 809 associated with the new composite media item 808. As can be seen in FIG. 8b, through a set of logic and/or rules the metadata processor 807 interprets the metadata subsets 801-804 and then processes them to create new metadata 809, and interprets the media item portions 805, 806 and then processes them to create a new composite media item 808. Unlike, FIG. 8a, the new metadata 809 does not contain pointers to the media item portions that create the composite media item 808. Rather, in FIG. 8b, the composite media item 808 is caused to be created by metadata processor 807 processing metadata subsets 801-804 in accordance with predetermined rules or logic in the same or similar manner to that discussed above. The metadata processor 807 then accesses, or causes another process or program to access media item portions 805, 806, which, are then processed in accordance with said rules or logic to form a new composite media item 808, which may then be experienced or stored or shared in any manner now known or to become known with respect to items of experianceable media.

In one embodiment, any number or combination of metadata subsets can be appended to or otherwise associated with the new metadata. In one embodiment, some or all of the metadata subsets 304, 306, 307, 308, 305, 309, 310 are appended to or otherwise associated with (311, 312, 313, 314) the new metadata 303 associated with the newly created composite media item. For example, in FIG. 3a, some of the metadata subsets 307, 308, 309, 310 not only make up the new metadata 303, but are also appended or otherwise associated 307', 308', 305', 309', 310' with the new metadata. In another example, in FIG. 3b, only metadata subsets 307, 309 are appended or otherwise associated 307', 309' with the new metadata 303. In one embodiment, although some of metadata subsets may not be appended or otherwise attached to the new metadata 303, they still may be incorporated into the new metadata 303. For example, in FIG. 3a metadata subsets 304, 306, 305 are not appended to the new metadata 303, but that does not mean that metadata subsets 304, 306, 305 cannot form, in part, the new metadata 303.

In another embodiment, as depicted in FIG. 3c, none of the metadata subsets 300, 301 are appended to or otherwise associated with the new metadata 303 associated with the newly created composite media item (not shown).

In one embodiment, the metadata that is appended or otherwise associated with the new metadata depends on the media item portions that are used to form the composite media item. For example, referring to FIG. 3b, if the only media item portions associated with metadata subsets 307, 308 are combined to form a composite media item, then the new metadata 303 associated with the composite media item comprises of metadata subsets 307, 308. Further, metadata subsets 307, 308 are appended or otherwise associated 307', 308' with the new metadata 303. Thus, in this exemplary embodiment, new metadata has been created containing all the information relating to its provenance, licensing requirements, business terms, and source media items of the collected components. This encapsulation of all relevant information for the newly composite media item makes it possible for commerce systems to obtain and utilize necessary information to reliably affect the commercial transfer of such products. For example, in one embodiment, a marketplace in composite media would be able to offer a search and discovery capability, enabling end users to search by any of the informative tags, such as artist or genre. The search and discovery software would find composite works that contained media portions related to the search terms used by the end user. In another embodiment, an end user might enter Gorillaz, and find not only work by this artist, but also composite media items wherein one component is a backing track by Gorillaz. If the user decided to purchase this sample track, the pricing and licensing information in the composite media item's metadata can be utilized to effect the transaction, notifying the user of the price required in, for example, a credit card transaction. Various payment schemes known or to become known for carrying out networked commerce may be used, and the particular payment scheme can be flexibly applied utilizing the teachings herein. For example, once the money has been collected for the item, the marketplace commerce system could examine the respective terms for the composite item sold, and discover that there are two rights holders who are to be paid, for example, $0.50 and $0.80 respectively for the content included in the composite media item. This money could be disbursed to each one using identifying information about the rights holders found, again, in the metadata of the composite media item. As can be seen, it would not be possible to accomplish such commerce easily, reliably or perhaps at all without the benefits of the composite metadata, particularly when one recognizes that myriad composite media items may be constructed by end users making use of the tool described, and that no one can envision or catalog with any ease or certainty all the possible combinations and composite metadata describing terms that will arise from such production.

In one embodiment, the logic and/or rules used to combine the metadata subsets and/or media item portions may be based on conditional logic operators. For example, Boolean operators such as "and", "or", "xor", and "not" and conditional logic such as "if then" and "if then else" statements can be utilized to determine whether and how to combine the metadata subsets and/or media item portions. As seen in FIG. 3a, the new metadata 303 can be formed as by using logic and/or rules. In one embodiment, the logic and/or rules are used to combine a set of business rules and licensing rules and terms and commerce terms associated with the metadata subsets. Other methods known to those skilled in the art of creating and utilizing metadata are also contemplated. Thus, the metadata processor can be appropriately programmed or designed to determine the commerce enabling information such as the licensing schemes, rights, and/or business terms, and commerce terms of the metadata associated with a composite media item. Furthermore, through the metadata processor, the metadata subsets can be combined based on specific commerce enabling information including the rights derived from the metadata subsets. In a further embodiment, the logically combined metadata associated with the composite media item will be appended or otherwise associated to the composite media item so that the commerce enabling information associated with the composite media item are easily recognized and useable.

FIG. 4 depicts a representation of an exemplary set of logic or rules 407, 408 used to determine whether the commerce enabling information of the metadata subsets can be combined. For example, in one embodiment, the commerce enabling information may comprise a set of rights. As can be seen in FIG. 4, for each set of logic and/or rules associated with a media item portion 407, there is a possible set of logic and/or rules 408 for a second media item portion or indeed for any media item portions added thereafter. As can be seen in FIG. 4, a set of icons 400 represents a set of rights derived from a metadata subset associated with a media item portion. In one embodiment, these rights may include the associated attribution 409, whether a media item portion is designated non-commercial 410, whether a media item portion is designated as preventing any derivative works 412, whether a media item portion is designated as share-alike 412, whether a media item portion is designated as commercial only 413, and the price of a copy of the media item portion 414. Thus a user building a media item may incorporate such icons through a user interface (e.g. FIG. 1) in drag and drop fashion to create a new media item with user selected commerce characteristics. The metadata processor is appropriately programmed or designed to follow the rules set forth in, or that govern certain types of metadata.

In one example, the commerce enabling information may state that the media item portion can be included on a commercial-only basis 413, and that a minimum fee of $0.40 414 must be paid to the rights holder when a copy of the new composite media item sold. Thus, if a third media item portion were to be included but use of that component was restricted to non-commercial 402 distribution, then the composite media item using the third media item portion is not feasible because the rights, rules, or terms conflict.

In another example, if a metadata subset requires specific commerce enabling information such as a share alike rights 413 that requires the media item portions only be conveyed with exactly the same terms under which the portions were acquired, then only the media item portions with metadata subsets that have the same share-alike designation 404 can be combined.

In yet another example, if a media item portion's license provides for non-commercial 402 designation, but with attribution 401 inclusion in a derivative work, and another media item portions' license specifies commercial-only 405 inclusion with the example $0.40 minimum terms 414, the composite media item is again non-feasible, as the rights conflict.

In another embodiment, the commercial enabling information may comprise a license to obtain and use samples of media items. Furthermore, the logic and/or rules may implement these license terms. For example, a license may allow a user or the system to obtain and use samples of a media item for any purpose other than advertising. In another embodiment, the license may prohibit copying and distribution of a composite media item comprising a sample unless the proper attribution is included. In another embodiment, a license may allow for only non-commercial copying and use of a sample in a composite media item.

In one embodiment, if a media item portions' rights are in conflict, the metadata processor, or tool incorporating the metadata processor, or the metadata processor, and other software, hardware or signal, causes the media item portion is filtered out or otherwise prevented from being combined or included in the composite media item portion. In one embodiment, rights may be in conflict when their designations do not match, when a designation specifically excludes the other, or when the rights associated cannot be logically combined. For example, if a media item portion is designated as non-commercial 410, then the other media item portion's metadata subset must also must also have the non-commercial 402 designation. In another example, if a media item portion is designated as commercial-only 413, then the other media item portion(s) should at a minimum not be designated non-commercial 410. In one embodiment, a lack of a non-commercial 410 specification means that the rights holder authorizes either commercial or non-commercial use of his or her work. So, if a media item portion is designated as commercial-only 413, any other media item portion(s) should at a minimum not be designated non-commercial 413. In a further embodiment, when a commercial-only designation 413 is used, an optional price per media item copy 414 will may follow, but there may be no such price per copy 406 requirements on other media item portions. Instead, all that is required is the lack of a non-commercial 410 designation.

In some embodiments, the rights may not impose a requirement on any other media item portions. For example, a media item portion may require attribution 409, but all other media item portions for combination are not required to have an attribution 401. Thus, in one embodiment, attribution is simplified and made reliably available since the attribution itself can be assured by the metadata processor by embedding the attribution directly in the new composite media item.

In other embodiments, a right may completely prevent a media item portion from being combined with any other media item portion. For example, if a media item portion contains a no derivative works 411 designation, no composite media item is possible.

In another embodiment, the conflicting media item portion is filtered out so that it may be considered or even used for a composite media item, but the user is not able to finalize and/or save the composite media item due to the conflicting media item portion. In another embodiment, the tool can be set to function without any filtering part of the tool but will notify the user of which distribution models, if any, may be used to conform at the rights collectively associated with the media item portions.

In a further embodiment, the metadata processor or tool may comprise a rights interpreter or translator for interpreting/translating the metadata language among different media item formats, metadata language, and multimedia resources across a wide range of networks and devices used by different communities, independent of structure and platform to achieve semantic reconciliation. It is important to note that as different types of metadata arise and standards develop, the metadata translator/interpreter function, performed by the metadata processor or by an ancillary processor or component, is able to interpret/translate these various types of metadata language. For example, in FIG. 5, a rights interpreter or translator 515 is applied to interpret/translate the metadata content and associated rights and rules associated with the metadata of disparate media items and media portions 505, 510 into the same metadata language 520 so that the metadata may be easily combined. Thus, in one embodiment, the rights interpreter/translator 515 can facilitate the transformation of metadata from the terminology of one operational domain or commerce system 505, 510 into that of another operational domain or commerce system 520 in an automated or partially-automated way with the minimum ambiguity or loss of semantic integrity.

In one embodiment, once the composite media item is determined to be feasible by the metadata processor or similar element, and deemed complete by the user or the system, the composite media item is saved and is associated or appended with newly generated metadata associated with the composite media item. For example, the metadata may be embedded in a field of the digital media file itself, rendered as a data container as discussed above, encapsulated data structure, or in some other form according to the approach to metadata employed. The final composite media item is then made available to third parties, and its commerce enabling information such as the rights, licensing, commerce, and business rule requirements are available when it is in turn incorporated into yet another media item.

In one embodiment, a commerce system for facilitating the transfer and exchange of payment of a composite media item is disclosed. For example, a commerce system affecting the transfer of a newly created composite media item can determine which composite media items are commercial and require a payment. The commerce system can determine the payment amount required for each copy sold, and by examining other metadata, can determine who the rights holder is. The rights holder metadata can contain sufficient information to enable the issuing of funds, or the notification that funds are available for pickup by the rights holder. In one embodiment, a commerce engine can determine the payment requirement for each of a set of media item portions making up a composite media item, and handle payment disbursements for each. In a further embodiment, the pricing of the composite media item can also be validated. In one embodiment, the price of the composite media item must equal or exceed the sum of individual split payments due collectively for the media item portions.

In one embodiment, the tool comprises a user interface (e.g., FIGS. 1 and 2) for creating a composite media item with an associated set of metadata. In one embodiment, the tool allows the user to identify media items, the metadata associated with the media items, the media item portions, and the metadata subsets associated with the media item portions. In one embodiment, the user interface allows a user to browse and/or search through a collection of media items. In a further embodiment, the user interface allows a user to browse/and or search through a collection of media item portions. In one embodiment, the user interface allows a user to browse and/or search through a collection of metadata associated with a media item. In another embodiment, the user interface allows a user to browse/and or search through a collection of metadata subsets associated with media item portions.

In another embodiment, the user may search for media items and media item portions via input criteria. The input criteria allows a user to search via relate to attributes associated with the media item including, but not limited to the album, artist, genre, type or category, price, identity of the rights holder, or by a specific licensing, commerce, or business rule or term. In another embodiment, the input criteria allow a user to search via predetermined information associated with the metadata subsets. In another embodiment, the input criteria allow a user to search via attributes associated with a media item portion. In one embodiment, the user interface facilitates the search through a drop down menu and a text field box that allows the user to select the search criteria from the drop down menu and enter the input into the text field box.

In a further embodiment, once the user or the system has identified a media item, the user interface displays the media item and its media item portions available for combining. For example, the media item and its media item portions may be displayed in a hierarchical fashion, in a drop down menu, in a right click menu, in a single area, or in multiple areas of the user interface. In another embodiment, once the user has identified a media item, the user interface displays the media item, its media item portions, and the metadata subsets associated with the media item portions.

One exemplary embodiment of a user interface is depicted in FIG. 1. As can be seen in FIG. 1, a graphical user interface window 100 comprises an area 104 for displaying graphical representations of the media item portions 112 and 113 of a media item 102, an area 103 for displaying a hierarchical menu associated with the media item portions, an area 109 that allows a user to play a media item 102 or media item portion 112 and 113, an area 105 for displaying and/or previewing the structure of a particular media item portion 112 and 113, an area 115 for displaying the metadata subsets 106, 107, 108 associated with a particular media item portion, and an area 114 for searching/and or browsing for media items and/or media item portions.

As depicted in FIG. 1, the user is able to browse, search, or otherwise identify media item portions for combining to create a composite media item. Furthermore, the user is able to view the metadata subsets associated with each media item portion. For example, in FIG. 1, the user has identified the media item 102 entitled "Hollaback Girl." As can be seen, the user interface displays the media item 102 in a hierarchical menu 103 arranged in the categories associated with the media item portions 112, 113. In particular, the categories associated with the media item portions of the "Hollaback Girl" media item include audio 110 and photos 111. Furthermore, the user interface displays in an adjacent area 104, the graphical images representing the particular media item portions 1123, 113 of the media item 102 highlighted and/or selected. In other embodiments, instead of graphical representations, other embodiments may display further information of the media item portions. Thus, in one embodiment, the area 104 displaying a hierarchical menu associated with the media item portions 112, 113 corresponds to the same media item portions displayed in the area 104 for displaying graphical representations of the media item portions 112, 113.

In FIG. 1, the media item portions are an a cappella track 112 and a jpeg image of the media item's artist 113. In one embodiment, as depicted in FIG. 1, when a media item portion 112 is highlighted or otherwise selected, it is then previewed in an area 105. In one embodiment, the selected media item portion's structure is displayed in this area 105 for the user. For example, the user can view the graphical representation of the waveform of the audio, the length, and any other relevant components of the media item. In a further embodiment, upon selecting a media item portion, the media item portion is also played in an area for the user. As can also be seen in FIG. 1, the user interface displays some of the metadata subsets associated with a media item portion. Specifically, in FIG. 1, some the metadata subsets associated with the A cappella track 112 is displayed in area 115. Specifically, some the metadata subsets associated with the A cappella track 112 comprise the identity of the rights holder 106 of the media item portion, the licensing information 107 governing the use of a media portion, and the business rules or terms applicable to the commercial use of a media portion 108.

Thus, in one embodiment, the user can identify a media item and through the tool's user interface, the user can view a hierarchical menu of the media item portions associated with the media item and view the graphical representations of the media item portions associated with the media item. Further, once the user highlights or otherwise selects a media item portion, the structure of the media item portion and the metadata subsets associated with the media item portion are displayed on the user interface. Moreover, the user interface is capable of playing the media item portion for the user. Of course there are many contemplated combinations and arrangements of areas and features of the tool user interface contemplated.

Figure 2:
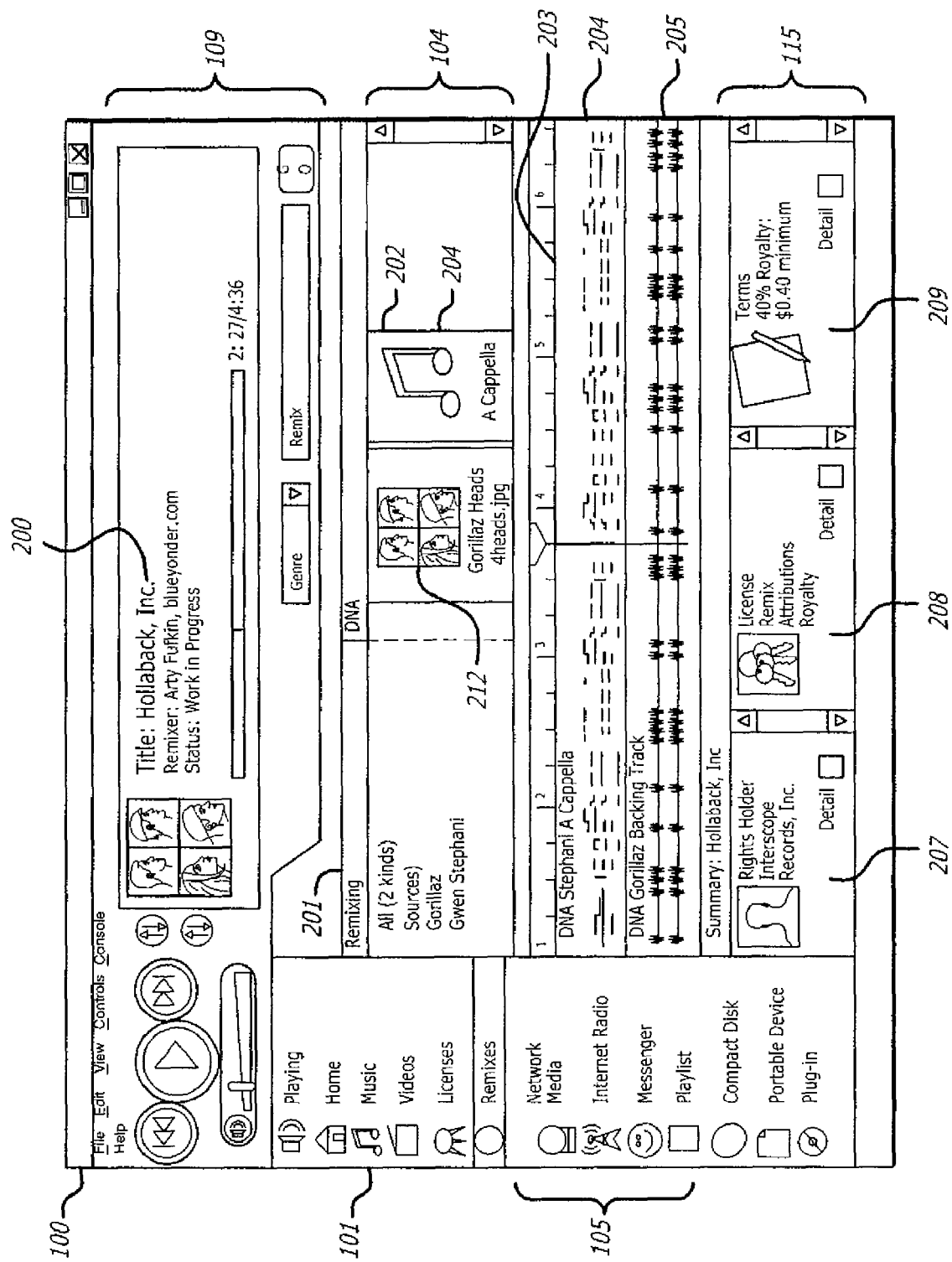
FIG. 2 is an exemplary user interface according to an embodiment of the present disclosure.

In a further embodiment, the tool's user interface allows a user to create, display, and/or play a composite media item based on at least two media item portions. Furthermore, the user interface displays the metadata associated with the composite media item, the metadata being based on the logical combination of the metadata subsets of the media item portions of the composite media item. FIG. 2 depicts an exemplary embodiment of a user interface for creating a composite media item. As can be seen in FIG. 2, a composite media item 200 has been created from two media item portions 204, 205 and is displayed on the user interface. Specifically, FIG. 2 depicts a graphical user interface window 100 comprising an area 104 for displaying graphical images representing the media item portions 202 and 212 of a particular media item 210. FIG. 2 also comprises an area 103 for displaying a hierarchical menu of the media item portions of the media items 210, 211. As can be seen in FIG. 2, the media item 210 selected or highlighted in the hierarchal menu is the media item with listed by its artist name, "Gorillaz". In one embodiment, upon highlighting or otherwise selecting a media item in the menu area 103, an area 104 adjacent to the menu displays graphical images representing the media item portions 212, 202 associated with the selected media item 210. As can be seen in area 104, the media item portions associated with the "Gorillaz" is a head shot in jpeg format 212 and a backing track 202. Thus, through the hierarchical menu area 103 and the adjacent area 104, the user is able to view the media item portions of media items.

Furthermore, as can be seen in FIG. 2, the composite media item 200, is based on two media item portions; an a capella track from Gwen Stefani 204 and a backing track from the Gorillaz 205. Accordingly, the user interface comprises an area 105 for displaying and/or previewing the structure of the media item portions 204, 205 used to create the composite media item 200. In FIG. 2, the structure of the A Capella track from Gwen Stefani 204 and the structure of the Gorillaz backing track are displayed in an area 105. Thus, the user is able to view the media item portions selected for the composite media item. Furthermore, the user interface comprises an area 109 that allows a user to play a composite media item 200 or each of the media item portions. In addition, the user interface comprises an area 115 for displaying the metadata subsets 207, 208, 209 associated with the composite media item. In one embodiment, the metadata associated with the composite media item is based on the metadata subsets associated with the media item portions used to create the composite media item. In FIG. 2, the metadata subsets displayed comprise an area 207 for displaying the identity of a rights holder associated with the composite media item, an area 208 for displaying the licensing information governing the use of the composite media item, and an area 209 for displaying some of the business rules or terms applicable to the commercial use of the composite media item. As discussed above, in one embodiment, the metadata subsets are logically combined together to form a set of metadata associated with the composite media item. In another embodiment, the set of metadata associated with the media item is based on the predetermined information derived from the metadata subsets.

Thus, the data container, the commerce enabling metadata, metadata associated with the media item and its tool each facilitate the managing of complex of rights, attributions, and business terms necessary to operate a commercial market place for composite media items. For example, the present disclosure enables a user to search for and locate component media items, browse through component elements (DNA) to discover, acquire, and use the source material, Provide composite creating interfaces enabling creation of new works that contain information about the provenance, commerce enabling information, associated rights, business rules, and general metadata of each component part. Also, these disclosures provide a way of "publishing" new works into a media directories or catalogs, Ingesting a large number of suitable media elements currently discoverable through searches into a library or remixable media, enable the inclusion of author information for new works, including association of authors with commercial entities that may be compensated for their work, enable the accounting of split payments amongst rights holders to the various media item portions elements incorporated within a single remix work, enhance the range of affinities associated with a given end user to include the media item portions in his or her collection, enable the creation of media collections that support easy transfer of newly-created remix media between users, as such media is represented by encapsulated, and easily transferred digital objects.

An embodiment of the present disclosure relates to a remix tool comprising a component for extracting a portion of a first media item having first metadata and for extracting a portion of a second media item having second metadata, a component for combining the first portion and the second portion to form a composite media item, and a component for analyzing the first metadata and the second metadata to extract portions of the first and second metadata to form a new set of metadata for association with the composite media item.

In an embodiment of the present disclosure some or all of either one or both of the first metadata and the second metadata may be extracted and inserted into at least one data container. The data container may comprise commerce-enabling information.

In an embodiment of the present disclosure, the commerce-enabling information may comprise usage rights, comprising a right to use either one or both of first portion and the second portion in a derivate work.

In some embodiments, the commerce-enabling information may further comprise a commercial designation, a non-commercial designation, an attribution of a publisher, a price per copy of either one or both of first portion and the second portion, identity of a rights holder, a set of licensing terms, a copyright message, a digital rights message, a pointer to a copyright message, and/or a pointer to licensing information.

In some embodiments of the present disclosure, the data container containing metadata may comprise an a cappella track, a backing track, a sample of the first media item, a graphical image of a media item, an equalizer preset of the first media item, an accompaniment of a media item, and/or a portion of the media item.

In embodiments of the present disclosure, portions of media items may comprise audio files, video files, podcasts, mp3 formatted files, aac recorded audio tracks, and/or graphical images.

In embodiments of the present invention, the portions of media items may be acquired from a server, acquired from a user's local media library accessed from a user's computing device, and/or acquired from the internet (or Internet, etc.).

In embodiments of the present disclosure, metadata related to a data container may comprise a string of text representing a name of the container, a title of a media item portion, a title of a source media item, a date the container is created, a date the container is modified, a genre associated with the container, a size of the container, a length of the container, a type of content associated with the container, a file type associated with the container, an international standard recording code associated with the container, software requirements for encoding the container, software requirements for decoding the container, and/or user-defined text information Those skilled in the art will recognize that the method and system of the present invention within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

What is claimed is:

1. A method comprising:
   extracting, via a computing device, a portion of a first media item having first metadata and a portion of a second media item having second metadata, each respective portion being a portion or component of a media item and not the entire media item;
   combining, via the computing device, said first portion and said second portion to form a composite media item; and
   analyzing, via the computing device, said first metadata and said second metadata to extract portions of said first and second metadata to form a new set of metadata for association with said composite media item, wherein the first metadata remains associated with the first media item portion and the second metadata remains associated with the second media item portion after said combining to form the composite media item and corresponding set of metadata in order to preserve a relationship between the respective media items and the media item portions, wherein upon extracting the first and second media item portions, the media item portions and respective media items exist separately.

2. The method of claim 1 wherein either one or both of said first portion and said second portion is extracted by examining either one or both of said first metadata and said second metadata to determine availability for remixing of either one or both of said first and said second portion.

3. The method of claim 2 wherein extracting either one or both of said first portion and said second portion further comprises obtaining either one or both of said first portion and said second portion.

4. The method of claim 3 wherein either one or both of said first portion and said second portion is obtained from a server.

5. The method of claim 3 wherein either one or both of said first portion and said second portion is obtained from a user's local media library.

6. The method of claim 3 wherein either one or both of said first portion and said second portion is obtained from an on-demand streaming music service.

7. The method of claim 3 wherein either one or both of said first portion and said second portion is obtained from the internet.

8. The method of claim 1 wherein either one or both of said first metadata and said second metadata is analyzed by traversing either one or both of said first metadata and said second metadata and comparing either one or both of said first metadata and said second metadata to known data so that either one or both of said first metadata and said second metadata is identified according to said known data.

9. The method of claim 1 wherein some or all of either one or both of said first metadata and said second metadata is extracted and inserted into at least one data container.

10. The method of claim 9 wherein said data container comprises commerce-enabling information.

11. The method of claim 9 wherein said data container comprises container related metadata, wherein the metadata comprises information descriptive the of the content of the composite media item and requirements for rendering.

12. The method of claim 1 wherein said first portion comprises an a cappella track.

13. The method of claim 1 wherein said first portion comprises a backing track.

14. The method of claim 1 wherein said first portion comprises a sample of said first media item.

15. The method of claim 1 wherein said first portion comprises a graphical image of said first media item.

16. The method of claim 1 wherein said first portion comprises an equalizer preset of said first media item.

17. The method of claim 1 wherein said first portion comprises an accompaniment of said first media item.

18. The method of claim 1 wherein said first portion comprises a portion of said first media item.

19. The method of claim 1 wherein either one or both of said first portion and said second portion is an audio file.

20. The method of claim 1 wherein either one or both of said first portion and said second portion is a video file.

21. The method of claim 1 wherein either one or both of said first portion and said second portion is a podcast.

22. The method of claim 1 wherein either one or both of said first portion and said second portion is in mp3 format.

23. The method of claim 1 wherein either one or both of said first portion and said second portion is a recorded audio track.

24. The method of claim 1 wherein either one or both of said first portion and said second portion is a graphical image.

25. The method of claim 1 wherein either one or both of said first portion and said second portion is acquired from a server.

26. The method of claim 1 wherein either one or both of said first portion and said second portion is acquired from a user's local media library accessed from a user's computing device.

27. The method of claim 1 wherein either one or both of said first portion and said second portion is acquired from the internet.

28. A method comprising:
identifying, via a computing device, a first metadata subset representing data associated with a first portion of a media item, the first portion being derived from a first source media item, the first metadata subset being derived from first metadata associated with the first source media item;
identifying, via the computing device, a second metadata subset representing data associated with a second portion of the media item, the second portion being derived from a second source media item, the second metadata subset being derived from second metadata associated with the second source media item, wherein each respective portion being a portion or component of a media item and not the entire media item; and
combining, via the computing device, the first portion and the second portion to form a composite media item, the first subset and the second subset forming a set of metadata for association with the composite media item that comprises predetermined information based on the first metadata subset and the second metadata subset, wherein the first metadata subset remains associated with the first media item portion and the second metadata subsets remains associated with the second media item portion after said combining to form the composite media item and corresponding set of metadata in order to preserve a relationship between the source media items and the media item portions, wherein upon deriving the media item portions, the media item portions and the source media items exist separately.

29. The method of claim 28, wherein formed metadata for the composite media item comprises any number and type of metadata subsets.

30. The method of claim 29, wherein the metadata subsets are identifiable groups identifying content, information, rendering capabilities and user-generated information for the composite media item.

31. The method of claim 29, further comprising:
identifying the formed set of metadata for the composite media item comprising the metadata subsets based upon attributes associated with either one or both of said first metadata and said second metadata, the attributes pertain to identifiers for the composite media item, wherein the attributes are identified subsequent to a content specific search.

32. The method of claim 29, wherein the metadata subsets for the composite media item comprise descriptive identifiers for location of said composite media item and associated information pertaining to the content and associated new metadata for said composite media item.

33. The method of claim 29, wherein the metadata subsets comprise informative tags and data containers identifying subset type information pertaining to each individual subset with the metadata.

34. The method of claim 33, wherein the metadata subsets comprise commerce enabling information pertaining to their respective media item.

35. The method of claim 28, wherein the first and second media item portions comprise at least one identifiable portion of each component of the first and the second media items.

* * * * *